United States Patent
Yasuda et al.

(10) Patent No.: US 10,266,274 B2
(45) Date of Patent: Apr. 23, 2019

(54) MOUNT MECHANISM OF ACCESSORY GEARBOX

(71) Applicant: KAWASAKI JUKOGYO KABUSHIKI KAISHA, Kobe-shi, Hyogo (JP)

(72) Inventors: Ryo Yasuda, Kakogawa (JP); Hirohito Shimizu, Kobe (JP); Hiroshi Fujii, Himeji (JP); Takuya Imai, Kakogawa (JP); Hiroaki Ootsuji, Kako-gun (JP); Hirofumi Akahori, Akashi (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/572,337

(22) PCT Filed: May 8, 2015

(86) PCT No.: PCT/JP2015/002350
§ 371 (c)(1),
(2) Date: Nov. 7, 2017

(87) PCT Pub. No.: WO2016/181420
PCT Pub. Date: Nov. 17, 2016

(65) Prior Publication Data
US 2018/0118357 A1    May 3, 2018

(51) Int. Cl.
*F16M 1/00* (2006.01)
*B64D 27/26* (2006.01)
(Continued)

(52) U.S. Cl.
CPC .............. *B64D 27/26* (2013.01); *B64D 41/00* (2013.01); *F02C 7/32* (2013.01); *F16F 1/3732* (2013.01);
(Continued)

(58) Field of Classification Search
USPC .......................................................... 248/638
See application file for complete search history.

(56) References Cited

U.S. PATENT DOCUMENTS 6,260,351 B1 * 7/2001 Delano .................. B64D 27/26
                                                             60/226.1
9,605,562 B2 * 3/2017 Bettagere ................ F01D 25/28
(Continued)

FOREIGN PATENT DOCUMENTS

EP    2522832 A1    11/2012
FR    2923542 A1    5/2009
(Continued)

OTHER PUBLICATIONS

International Search Report of PCT/JP2015/002350 dated Jul. 28, 2015.

*Primary Examiner* — Monica E Millner
(74) *Attorney, Agent, or Firm* — Sughrue Mion, PLLC

(57) ABSTRACT

A mount mechanism used to mount an accessory gear box on an engine case in an aircraft engine, includes a pair of first brackets apart from each other in a circumferential direction of the engine case; the pair of first brackets being connected to each other via the link, both end portions of the link being coupled to the pair of first brackets by a pair of first pins, respectively; an annular anti-vibration element penetrated by each of the pair of first pins, the annular anti-vibration element being retained by at least one of each of the pair of first brackets and the end portion of the link; and a second bracket fastened to the other of the engine case and the accessory gear box, the second bracket box being coupled to the link by a second pin at a location between the pair of first brackets.

9 Claims, 5 Drawing Sheets

(51) Int. Cl.
　　*B64D 41/00*　　(2006.01)
　　*F02C 7/32*　　(2006.01)
　　*F16F 1/373*　　(2006.01)
　　*F16F 15/08*　　(2006.01)

(52) U.S. Cl.
　　CPC .......... *F16F 15/08* (2013.01); *F05D 2260/30* (2013.01); *F05D 2260/4031* (2013.01); *F05D 2260/96* (2013.01); *Y02T 50/44* (2013.01)

(56) References Cited

U.S. PATENT DOCUMENTS

| | | | |
|---|---|---|---|
| 2009/0184197 A1* | 7/2009 | Cloft | B64D 27/26 244/54 |
| 2009/0308972 A1* | 12/2009 | Foster | B64D 27/26 244/54 |
| 2012/0304811 A1* | 12/2012 | Niggemeier | F02C 7/32 74/606 R |
| 2013/0042630 A1* | 2/2013 | Muldoon | F02C 7/32 60/796 |
| 2014/0314546 A1* | 10/2014 | Davis | F01D 21/045 415/124.1 |

FOREIGN PATENT DOCUMENTS

| | | |
|---|---|---|
| JP | 2000-177697 A | 6/2000 |
| JP | 2002-127996 A | 5/2002 |
| JP | 2007-69820 A | 3/2007 |
| JP | 2012-167714 A | 9/2012 |

\* cited by examiner

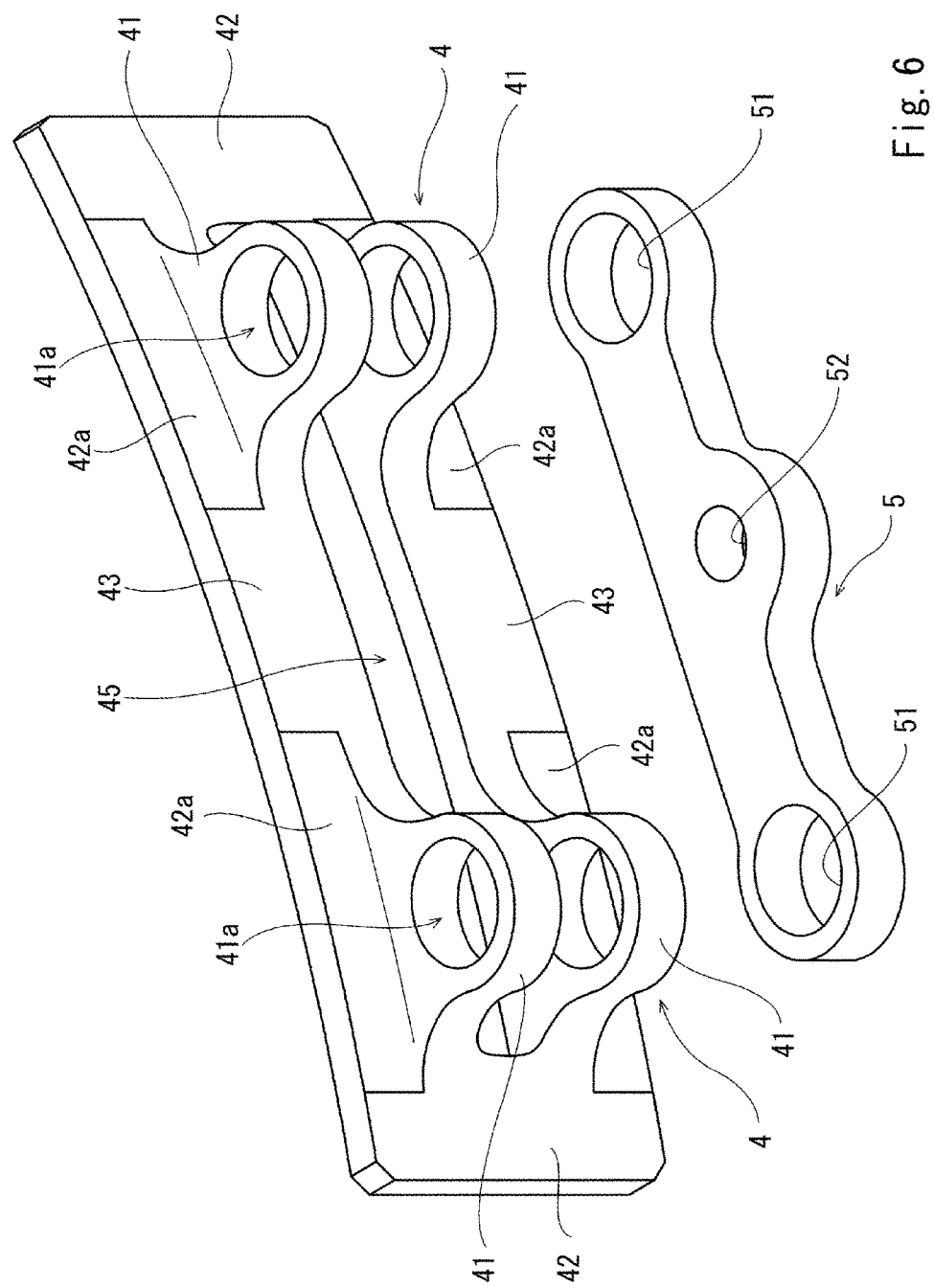

MOUNT MECHANISM OF ACCESSORY GEARBOX

CROSS REFERENCE TO RELATED APPLICATIONS

This application is a National Stage of International Application No. PCT/JP2015/002350 filed May 8, 2015, the contents of all of which are incorporated herein by reference in their entirety.

TECHNICAL FIELD

The present invention relates to a mount mechanism used to mount an accessory gear box on an engine case in an aircraft engine.

BACKGROUND ART

An accessory gear box of an aircraft engine is mounted on an engine case. The accessory gear box serves to distribute a driving force taken out of an engine core to various auxiliary devices. In general, the accessory gear box extends in the circumferential direction of the engine case and is mounted on the engine case by a plurality of mount mechanisms arranged at multiple points in the circumferential direction of the engine case.

For example, Patent Literature 1 discloses a pair of mount mechanisms (namely, side hangers) disposed at both end portions of an accessory gear box. Each of the mount mechanisms incudes a first bracket fastened to an engine case, a second bracket fastened to the accessory gear box, and a link whose both end portions are coupled to the first bracket and to the second bracket by pins.

CITATION LIST

Patent Literature

Patent Literature 1: Japanese-Laid Open Patent Application Publication No. 2000-177697

SUMMARY OF INVENTION

Technical Problem

Typically, in the above-described mount mechanisms, metal bushes are disposed between the first and second brackets and the pins and between the link and the pins. Regarding the aircraft engine, consideration should be given to a situation in which a fan blade or a compressor blade is disengaged from a rotor assembly inside an engine case. In a case where the blade is disengaged in this way, an engine core is stopped. However, due to an unbalanced state of the rotor assembly or a collision of the disengaged blade against the engine case, a great vibration is generated in the engine core before the engine core is stopped.

In the above-described mount mechanisms including the metal bushes, in a case where a great vibration is generated in the engine core in a state in which the blade is disengaged, a great load and a great vibration are transmitted from the engine case to the accessory gear box. In view of this, the accessory gear box is required to be designed to have a high strength.

In order to suppress a load and a vibration which are transmitted to the accessory gear box in a state in which the blade is disengaged, and reduce the size and weight of the accessory gear box, annular anti-vibration (vibration-proof) elements (e.g., rubber bushes) may be used in the mount mechanisms instead of the metal bushes. However, in this case, it is necessary to use the anti-vibration elements with a very large size to absorb a great load and a great vibration in a state in which the blade is disengaged. The anti-vibration elements with a very large size make the accessory gear box distant from the engine case. As a result, the accessory gear box interferes with a nacelle (cowling) accommodating the aircraft engine.

In view of the above-described circumstances, an object of the present invention is to provide a mount mechanism of an accessory gear box which can include anti-vibration elements with a relatively small size.

Solution to Problem

To solve the above-described problem, the present invention provides a mount mechanism used to mount an accessory gear box on an engine case in an aircraft engine, the mount mechanism of the accessory gear box comprising: a pair of first brackets fastened to one of the engine case and the accessory gear box, the pair of first brackets being apart from each other in a circumferential direction of the engine case; a link extending in such a manner that the pair of first brackets are connected to each other via the link, both end portions of the link being coupled to the pair of first brackets by a pair of first pins, respectively; an annular anti-vibration element penetrated by each of the pair of first pins, the annular anti-vibration element being retained by at least one of each of the pair of first brackets and the end portion of the link; and a second bracket fastened to the other of the engine case and the accessory gear box, the second bracket box being coupled to the link by a second pin at a location between the pair of first brackets.

In accordance with this configuration, a load and a vibration which are transmitted from the engine case to the mount mechanism are distributed to the pair of first brackets in a state in which a blade is disengaged. For this reason, the anti-vibration elements with a relatively small size can be used for the pair of first pins used to couple the first brackets to the both end portions of the link. This makes it possible to suppress a load and a vibration which are transmitted to the accessory gear box and reduce the size and weight of the accessory gear box. Since the anti-vibration element is retained by at least one of each of the first brackets and the end portion of the link (at least either each of the first brackets or the end portion of the link), the mount mechanism can be flexibly designed depending on a load and a vibration.

Advantageous Effects of Invention

In accordance with the present invention, it is possible to provide a mount mechanism of an accessory gear box which can include anti-vibration elements with a relatively small size.

BRIEF DESCRIPTION OF DRAWINGS

FIG. 6 is an exploded perspective view of a pair of first brackets and a link.

DESCRIPTION OF EMBODIMENTS

Figure 1:
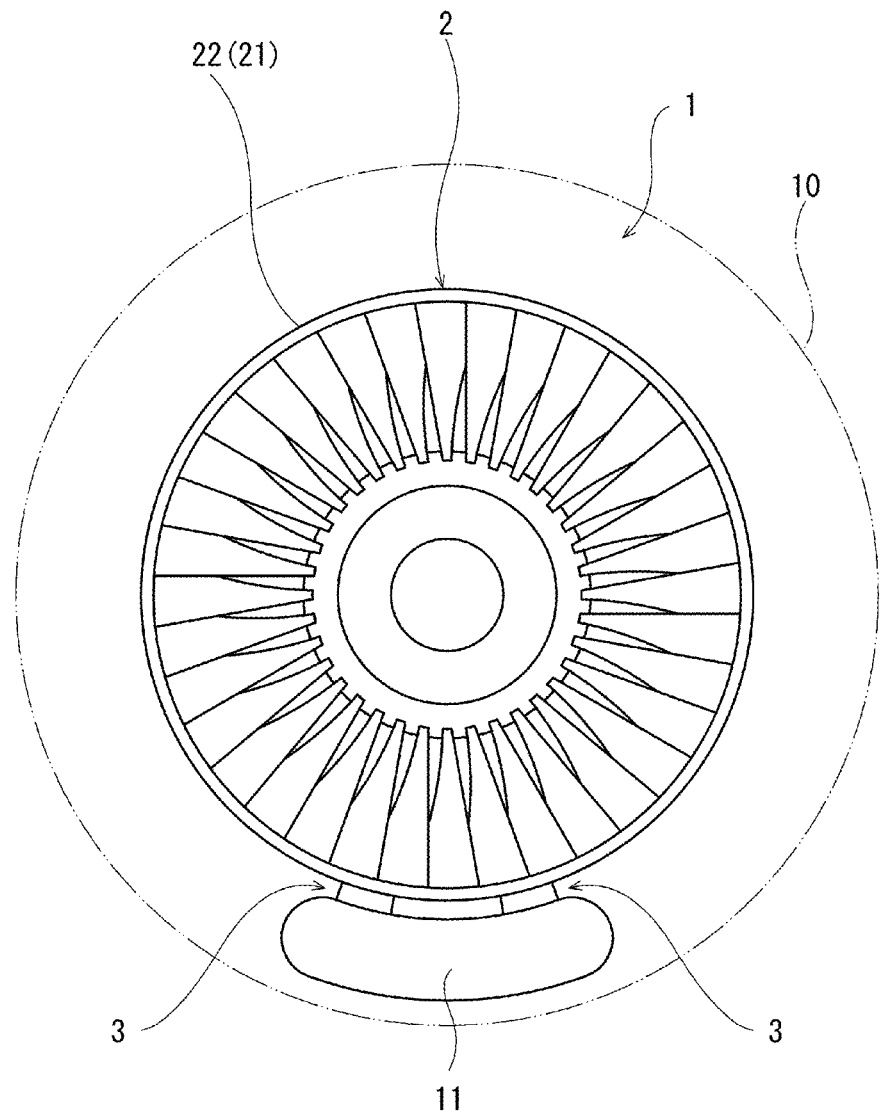
FIG. 1 is a front view of an aircraft engine to which mount mechanisms of an accessory gear box according to one embodiment of the present invention are applied.
Figure 2:
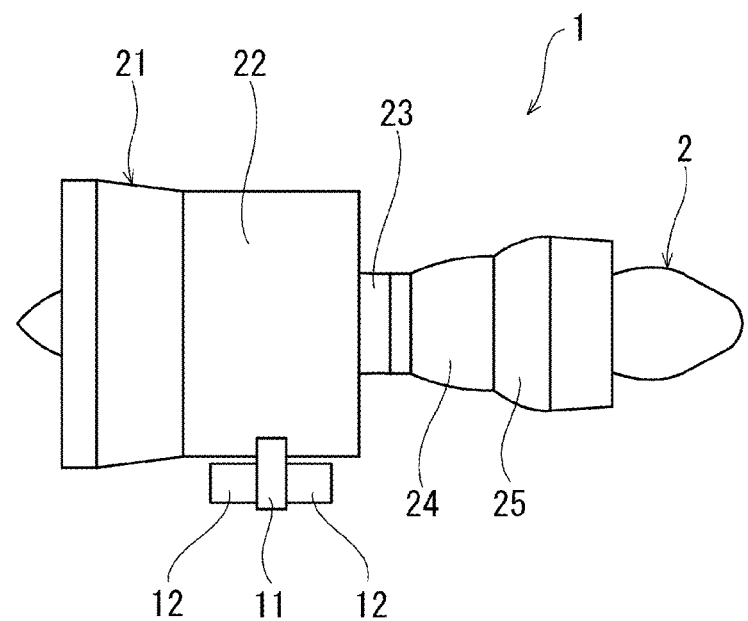
FIG. 2 is a side view of the aircraft engine of FIG. 1.

FIGS. 1 and 2 show an aircraft engine 1 to which mount mechanisms 3 of an accessory gear box according to one embodiment of the present invention are applied. The aircraft engine 1 is accommodated in a nacelle (cowling) 10. The aircraft engine 1 includes an engine core 2 and an accessory gear box 11.

The engine core 2 includes an engine case 21 accommodating a rotary assembly. As shown in FIG. 2, the engine case 21 includes a fan case 22, a compressor case 23, a combustion chamber case 24, and a turbine case 25.

Figure 3:
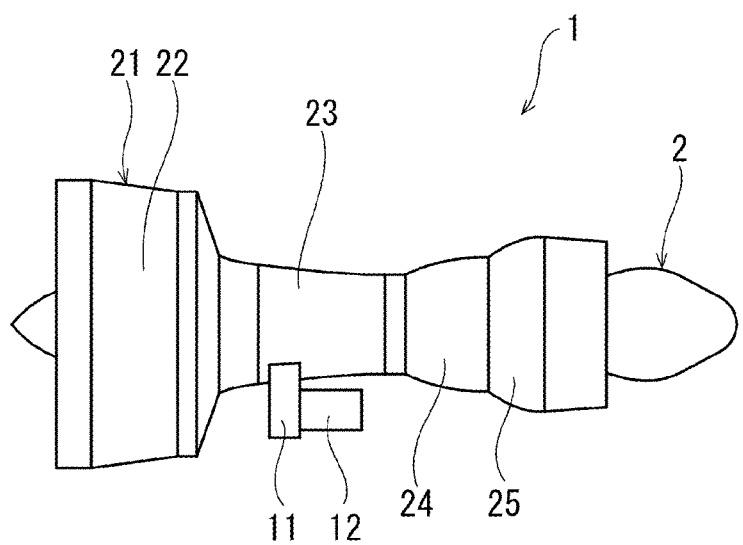
FIG. 3 is a side view of an aircraft engine according to a modified example.

The accessory gear box 11 extends in the circumferential direction of the engine case 21. The accessory gear box 11 is mounted on the engine case 21 of the engine core 2 by the pair of mount mechanisms 3 disposed at both end portions of the accessory gear box 11. In the present embodiment, the accessory gear box 11 is mounted on the fan case 22. Alternatively, as shown in FIG. 3, the accessory gear box 11 may be mounted on the compressor case 23. A plurality of auxiliary devices 12 are mounted on the accessory gear box 11.

Figure 4:
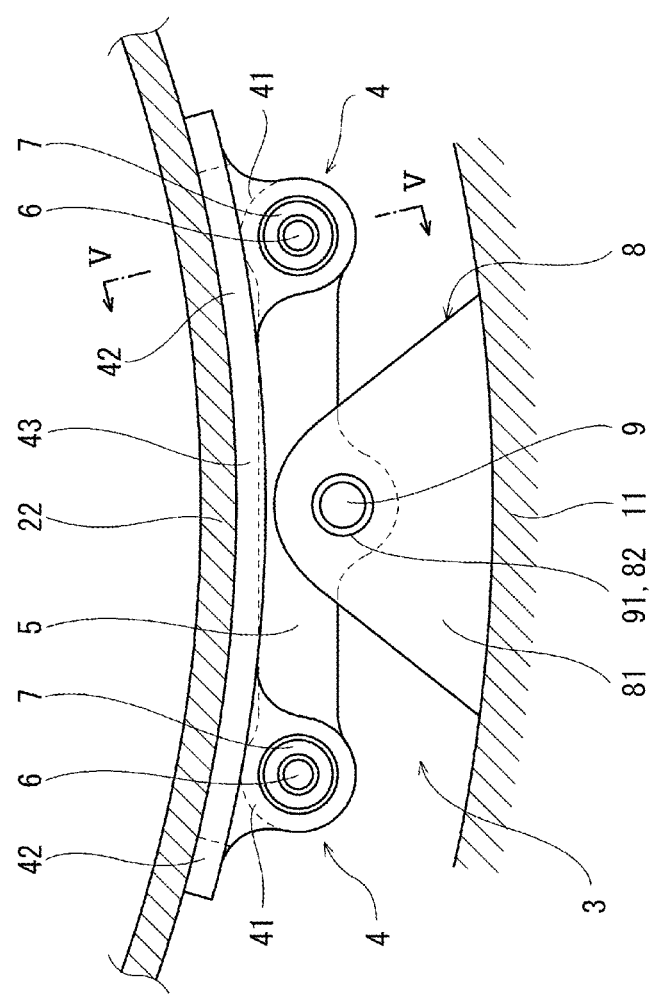
FIG. 4 is a front view of the mount mechanism.

Next, each of the mount mechanisms 3 will be described in detail with reference to FIGS. 4 to 6. Note that the accessory gear box 11 may be mounted on the compressor case 23 as described above. Therefore, in that case, the fan case 22 (described later) may be replaced by the compressor case 23, as a matter of course.

Each of the mount mechanisms 3 incudes a pair of first brackets 4 fastened to the fan case 22, and a second bracket 8 fastened to the accessory gear box 11. The first brackets 4 are fastened to the fan case 22 by, for example, fastening members (e.g., bolts) which are not shown. Alternatively, the first brackets 4 may be integrated with the fan case 22. In this case, each of the first brackets 4 may include only a pair of first lugs 41 (described later), without including lands 42 (described later). The second bracket 8 is fastened to the accessory gear box 11 in such a manner that the second bracket 8 is integrated with a housing of the accessory gear box 11, for example. Alternatively, the second bracket 8 may be fastened to the accessory gear box 11 by fastening members such as bolts. The pair of first brackets 4 are connected to the second bracket 8 via a link 5. In the present embodiment, the link 5 is a linear (straight-line) member with a constant width.

The pair of first brackets 4 are apart from each other in the circumferential direction of the fan case 22. Each of the pair of first brackets 4 includes the pair of first lugs 41 between which the end portion of the link 5 is interposed, and the land 42 with a plate shape which is in surface contact with the fan case 22. In other words, the lands 42 are bent to conform in shape to the fan case 22.

The land 42 of each of the pair of first brackets 4 has a U-shape in which the land 42 opens toward the other of the pair of first brackets 4. In other words, each of the lands 42 includes a pair of arm portions 42a which are parallel to each other on both sides of an opening of the land 42. The pair of first lugs 41 protrude from the arm portions 42a, respectively.

A pair of connectors 43 connect the arm portions 42a of the land 42 of one of the pair of first brackets 4 to the arm portions 42a of the land 42 of the other first bracket 4. In other words, the pair of first brackets 4 and the pair of connectors 43 constitute a bracket unit having an elongated hole 45 in a center region. The elongated hole 45 serves to avoid interference between the bracket unit and the link 5. In this configuration, the size of each of the mount mechanisms 3 in the radial direction of the fan case 22 can be reduced. Note that the configuration of each of the mount mechanisms 3 may be suitably changed so that the mount mechanism 3 is not formed with the elongated hole 45. The connectors 43 are plate-shaped members which have a thickness equal to that of the lands 42 and are bent to conform in shape to the fan case 22 for surface contact with the fan case 22.

The link 5 extends in such a manner that the pair of first brackets 4 are connected to each other via the link 5. The link 5 may be bent to conform in shape to the fan case 22. The both end portions of the link 5 are coupled to the pair of first brackets 4 by a pair of first pins 6, respectively.

Figure 5:
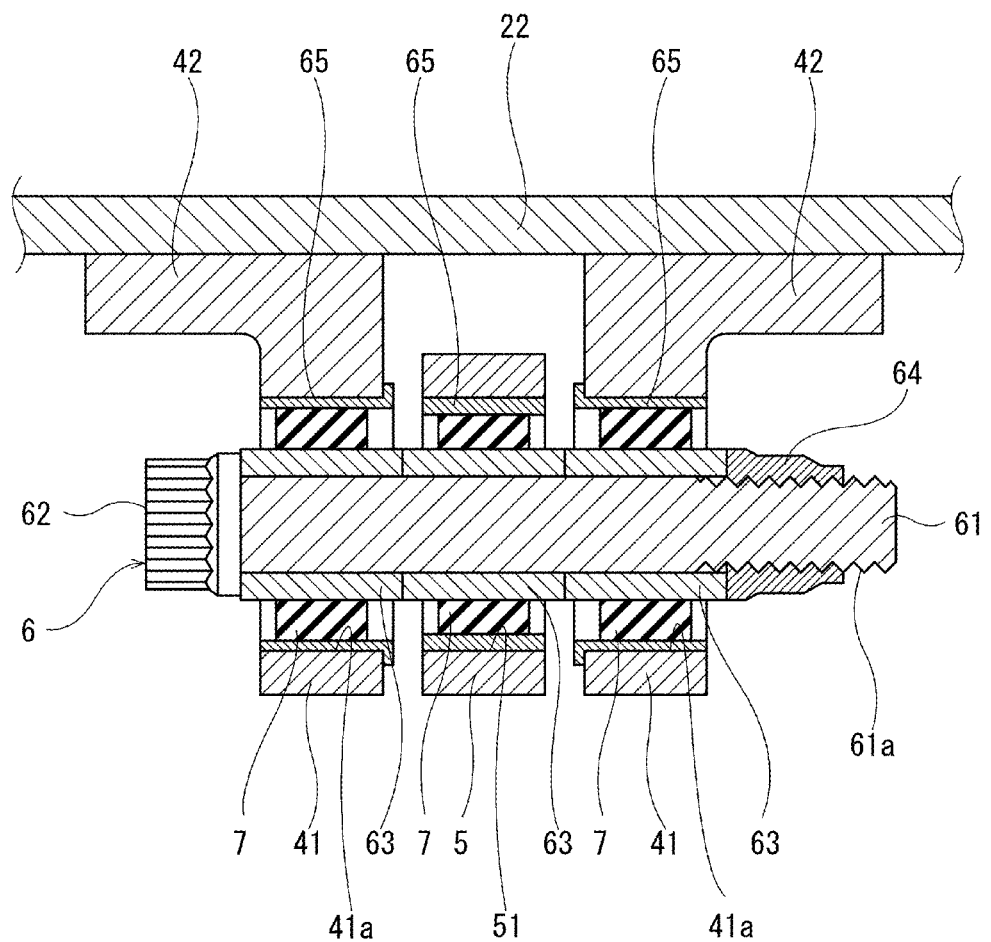
FIG. 5 is a cross-sectional view taken along line V-V of FIG. 4

In the present embodiment, as shown in FIG. 5, three rubber bushes 7 are penetrated by each of the first pins 6, as annular anti-vibration elements. These rubber bushes 7 are retained by the pair of first lugs 41 of each of the first brackets 4 and the end portion of the link 5, respectively.

More specifically, the first lugs 41 are provided with retaining holes 41a, respectively, in which the rubber bushes 7 are accommodated, while the end portion of the link 5 is provided with a retaining hole 51 in which the rubber bush 7 is accommodated. Outer sleeves 65 are fitted to the retaining holes 41, 51a, respectively. In contrast, three inner sleeves 63 are fitted to each of the first pins 6. Each of the rubber bushes 7 is joined to corresponding one of the inner sleeves 63 and corresponding one of the outer sleeves 65, by, for example, an adhesive.

The material of the rubber bushes 7 is not particularly limited. Various materials may be used as the material of the rubber bushes 7. Each of the rubber bushes 7 has a configuration in which a spring constant in the radial direction of the first pin 6 is higher than that in the axial direction of the first pin 6. Such anisotropy of the spring constant can be realized by, for example, orientation of an additive agent to be added in manufacturing of the rubber bushes 7. The anisotropy of the spring constant makes it possible to adjust the spring constant and a damping rate into desired ones.

The spring constant of each of the rubber bushes 7 in the radial direction of the first pin 6 has, for example, a non-linear characteristic in which the spring constant increases exponentially with respect to a distortion.

In the present embodiment, each of the first pins 6 is a bolt including a shaft portion 61 formed with a thread 61a in at least a tip end thereof, and a head portion 62. A nut 64 is engaged with the thread 61a. The nut 64 and the head portion 62 serve to sandwich the three inner sleeves 63 between them. Note that the configuration of each of the first pins 6 is not limited to this and can be suitably changed.

The second bracket 8 is coupled to the link 5 by a second pin 9, at a location between the pair of first brackets 4. The second bracket 8 includes a pair of second lugs 81 between which the center portion of the link 5 is interposed. In the present embodiment, metal bushes 91 penetrated by the second pin 9 are retained by the second bracket 8 and the link 5. Specifically, the second bracket 8 and the link 5 are provided with fitting holes 82, 52, respectively to which the metal bushes 91 are fitted.

As should be appreciated from the above, in the mount mechanisms 3 of the present embodiment, a load and a vibration which are transmitted from the fan case 22 to each of the mount mechanism 3 is distributed to the pair of first brackets 4 in a state in which a blade is disengaged. For this reason, the rubber bushes 7 with a relatively small size can be used for the pair of first pins 6 used to couple the first brackets 4 to the both end portions of the link 5. This makes it possible to suppress a load and a vibration which are transmitted to the accessory gear box 11 and reduce the size and weight of the accessory gear box 11.

The pair of first brackets 4 may be independent of each other. Nonetheless, in a case where the pair of first brackets 4 and the pair of connectors 43 constitute the single bracket unit, the pair of first brackets 4 can be handled as an integrated member. Since the elongated hole 45 is formed by the openings of the lands 42 and a gap between the connectors 43, the link 5 can be formed in a linear (straight-line) shape even when the bracket unit is bent to conform in shape to the fan case 22. Therefore, manufacturing cost of the link 5 can be reduced.

In addition, in the present embodiment, the metal bushes 91 are retained by the second bracket 8 and the link 5, respectively. In this configuration, cost can be reduced, compared to a case where the rubber bushes 71 are also used for the second bracket 5.

Further, in the present embodiment, since the three inner sleeves 63 are sandwiched between the head portion 62 of the bolt which is the first pin 6, and the nut 64, each of the mount mechanisms 3 can be easily assembled.

MODIFIED EXAMPLE

The present invention is not limited to the above-described embodiment, and can be modified in various ways within the scope of the invention.

For example, each of the first brackets 4 may not always include the pair of first lugs 41, and may include only one first lug 41. In this case, each of the both end portions of the link 5 may have two forked portions between which the first lug 41 is interposed. Or, in a case where the second bracket 8 includes only one second lug 81 in this configuration, the link 5 may include two pieces between which the first lug 41 and the second lug 81 are interposed. Nonetheless, in a case where each of the first brackets 4 includes the pair of first lugs 41 and the second bracket 8 includes the pair of second lugs 81 like the configuration of the present embodiment, the link 5 can be configured as a single member with a simple shape. This can reduce cost.

In addition, the rubber bushes 7 may not always be retained by the pair of first lugs 41 and the end portion of the link 5 so long as the rubber bushes 7 are retained by at least one of each of the first brackets 4 and the end portion of the link 5 (at least either each of the first brackets 4 or the end portion of the link 5). In a case where the rubber bushes 7 are retained by at least one of the first bracket 4 and the end portion of the link 5 in this way, each of the mount mechanisms 3 can be flexibly designed depending on a load and a vibration.

Further, the annular anti-vibration elements of the present embodiment are not limited to the rubber bushes 7. For example, as the annular anti-vibration elements, members of a damper type which utilizes a liquid or metal-made springs may be used.

Although in the above-described embodiment, the first brackets 4 are fastened to the engine case 21 and the second bracket 8 is fastened to the accessory gear box 11, the first brackets 4 may be fastened to the accessory gear box 11 and the second bracket 8 may be fastened to the engine case 21 in an alternative configuration.

Instead of the metal bushes 91, the rubber bushes 7 may be retained by the second bracket 8 and the link, depending on a load and a vibration generated in a state in which the blade is disengaged (except a case where the first brackets 4 are fastened to the accessory gear box 11 and the second bracket 8 is fastened to the engine case 21).

REFERENCE SIGNS LIST 1 aircraft engine
11 accessory gear box
21 engine case
3 mount mechanism
4 first bracket
41 first lug
41a retaining hole
42 land
42a arm portion
43 connector
5 link
51 retaining hole
6 first pin
61 shaft portion
61a thread
62 head portion
63 inner sleeve
64 nut
65 outer sleeve
7 rubber bush (anti-vibration element)
8 second bracket
81 second lug
9 second pin
91 metal bush

The invention claimed is:

1. A mount mechanism used to mount an accessory gear box on an engine case in an aircraft engine, the mount mechanism of the accessory gear box comprising:
   a pair of first brackets fastened to one of the engine case and the accessory gear box, the pair of first brackets being apart from each other in a circumferential direction of the engine case;
   a link constituted by a linear member extending in one direction and extending between the pair of first brackets to connect each other via the link, both end portions of the link being coupled to the pair of first brackets by a pair of first pins, respectively;
   an annular anti-vibration element penetrated by each of the pair of first pins, the annular anti-vibration element being retained by at least one of each of the pair of first brackets and the end portions of the link; and
   a second bracket fastened to the other of the engine case and the accessory gear box, the second bracket being coupled to the link by a second pin at a location between the pair of first brackets,
   wherein each of the pair of first brackets includes a pair of first lugs between which one end portion of the end portions of the link is interposed, and
   wherein the second bracket includes a pair of second lugs between which a center portion of the link is interposed.

2. The mount mechanism of the accessory gear box according to claim 1,
   wherein the annular anti-vibration element is a rubber bush, and
   wherein the rubber bush has a configuration in which a spring constant in a radial direction of each of the pair of first pins is higher than a spring constant in an axial direction of each of the pair of first pins.

3. The mount mechanism of the accessory gear box according to claim 1,
wherein the annular anti-vibration element is one of annular anti-vibration elements retained by the pair of first lugs and a corresponding one of the end portions of the link, respectively, and
wherein each of the annular anti-vibration elements is joined to an inner sleeve fitted to each of the pair of first pins and to an outer sleeve fitted to a retaining hole provided in the first lugs or the link.

4. The mount mechanism of the accessory gear box according to claim 3,
wherein each of the first pins is a bolt including a shaft portion formed with a thread in at least a tip end thereof, and a head portion, and
wherein the inner sleeve is one of a plurality of inner sleeves, and a nut is engaged with the thread to sandwich that the plurality of inner sleeves between the nut and the head portion.

5. The mount mechanism of the accessory gear box according to claim 1,
wherein each of the pair of first brackets includes a land with a U-shape in which the land opens toward the other of the pair of first brackets, and the pair of first lugs protrude from arm portions of the land which are parallel to each other, the mount mechanism of the accessory gear box further comprising:
a pair of connectors that connect the arm portions of the land of one of the pair of first brackets to the arm portions of the land of the other of the pair of first brackets.

6. The mount mechanism of the accessory gear box according to claim 1,
wherein a metal bush is penetrated by the second pin and retained by each of the second bracket and the link.

7. A mount mechanism used to mount an accessory gear box on an engine case in an aircraft engine, the mount mechanism of the accessory gear box comprising:
a pair of first brackets fastened to one of the engine case and the accessory gear box, the pair of first brackets being apart from each other in a circumferential direction of the engine case;
a link extending between the pair of first brackets to connect each other via the link, both end portions of the link being coupled to the pair of first brackets by a pair of first pins, respectively;
an annular anti-vibration element penetrated by each of the pair of first pins, the annular anti-vibration element being retained by at least one of each of the pair of first brackets and the end portions of the link; and
a second bracket fastened to the other of the engine case and the accessory gear box, the second bracket being coupled to the link by a second pin at a location between the pair of first brackets,
wherein each of the pair of first brackets includes a pair of first lugs between which one end portion of the end portions of the link is interposed,
wherein the second bracket includes a pair of second lungs between which a center portion of the link is interposed,
wherein the annular anti-vibration element is one of annular anti-vibration elements retained by the pair of first lugs and a corresponding one of the end portions of the link, respectively, and
wherein each of the annular anti-vibration elements is joined to an inner sleeve fitted to each of the pair of first pins and to an outer sleeve fitted to a retaining hole provided in the first lugs or the link.

8. A mount mechanism used to mount an accessory gear box on an engine case in an aircraft engine, the mount mechanism of the accessory gear box comprising:
a pair of first brackets fastened to one of the engine case and the accessory gear box, the pair of first brackets being apart from each other in a circumferential direction of the engine case;
a link extending between the pair of first brackets to connect each other via the link, both end portions of the link being coupled to the pair of first brackets by a pair of first pins, respectively;
an annular anti-vibration element penetrated by each of the pair of first pins, the annular anti-vibration element being retained by at least one of each of the pair of first brackets and the end portions of the link; and
a second bracket fastened to the other of the engine case and the accessory gear box, the second bracket being coupled to the link by a second pin at a location between the pair of first brackets,
wherein each of the pair of first brackets includes a pair of first lugs between which one end portion of the end portions of the link is interposed,
wherein the second bracket includes a pair of second lungs between which a center portion of the link is interposed,
wherein each of the pair of first brackets includes a land with a U-shape in which the land opens toward the other of the pair of first brackets, and the pair of first lugs protrude from arm portions of the land which are parallel to each other, the mount mechanism of the accessory gear box further comprising:
a pair of connectors that connect the arm portions of the land of one of the pair of first brackets to the arm portions of the land of the other of the pair of first brackets.

9. The mount mechanism of the accessory gear box according to claim 1, wherein the location of the second pin in the link overlaps a line extending between the pair of first pins.

* * * * *